UNITED STATES PATENT OFFICE.

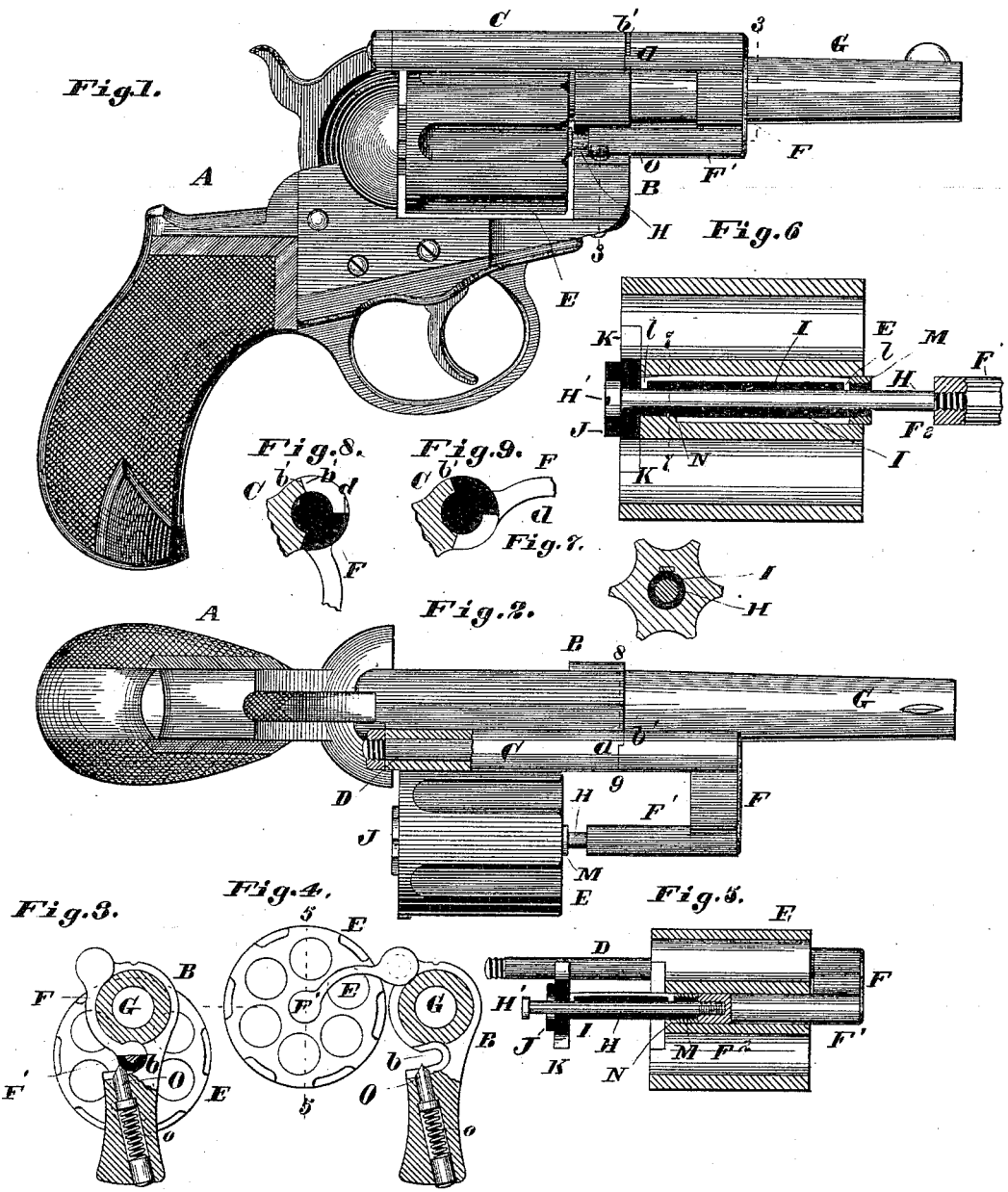

HENRY GOODMAN, OF ST. LOUIS, MISSOURI, ASSIGNOR OF ONE-HALF TO DANIEL P. KANE, OF SAME PLACE.

REVOLVER.

SPECIFICATION forming part of Letters Patent No. 274,093, dated March 13, 1883.

Application filed September 7, 1882. (No model.)

*To all whom it may concern:*

Be it known that I, HENRY GOODMAN, of the city of St. Louis, in the State of Missouri, have invented a certain new and useful Improvement in Revolvers, of which the following is a full, clear, and exact description, reference being had to the accompanying drawings, forming part of this specification.

My invention consists in details of construction hereinafter described and claimed.

Figure 1 shows the pistol in side view. Fig. 2 is a top view with the cylinder thrown out in position for charging. Fig. 3 is a transverse section at jogged line 3 3, Fig. 1, (looking toward the breech.) Fig. 4 is a section on the same line as Fig. 3, but showing the cylinder in the position it occupies in Fig. 2. Fig. 5 is a detail longitudinal section at 5 5, Fig. 4, showing the cylinder in the position it occupies just after the extraction of the shells. Fig. 6 is an enlarged longitudinal section at line 5 5, Fig. 4, showing the cylinder in position for loading. Fig. 7 is a detail transverse section at 7 7, Fig. 6. Fig. 8 is a detail transverse section, showing the joint by which the hinged frame is connected to the barrel, the joint being shown in same position as in Fig. 1; and Fig. 9 is a similar view, except that the joint occupies the same position as in Fig. 2. These sections are at 8 9, Fig. 2.

The stock A may be of ordinary or any suitable construction. The breech-frame B is made with a socket-piece, C, upon one side, forming the bearing of a pintle, D, upon which swings the frame that supports the cylinder E. This frame has an arm, F, curved to fit the side of the barrel G, with cylindrical pin F' extending parallel to the barrel. Into the end of the pin F' is screwed the arbor-pin H, upon which the cylinder E revolves. The cylinder E does not turn directly on the pin H, but is supported on a sleeve, I, turning on the said pin. Upon the rear end of the sleeve is the ratchet-hub J, by which the cylinder is caused to revolve by the usual pawl. The pin H is made somewhat longer than the sleeve I, so that the sleeve, besides its free revolutionary movement upon the pin, has a limited endwise movement thereon, being limited in the latter movement by the end of the pin F' and by the head H' of the screw-pin H, said head being seated in the hub J when the cylinder is in the position shown in Figs. 1, 2, and 6. The cylinder E has a limited endwise movement on the sleeve I, being moved forward thereon (when in the position shown in Fig. 2) for the purpose of extracting the cartridge-shells by means of the extractor K, that is fixed to the hub J, forming the rear end of the sleeve. The cylinder E is prevented from turning on the sleeve by the spline L, which is seated in the cylinder and secured in the sleeve by means of its ends *l*, that are turned down at a right angle, and, passing through the sleeve, bear against the pin H. The spline is so formed that its ends spring inward against the pin and serve to prevent the too free movement of the sleeve upon the pin, while at the same time permitting the required freedom of movement.

M is a collar screwing upon the sleeve I, and fitting the counter-bore extending from the front end of the cylinder back to an interior shoulder, N, from which point the axial bore of the cylinder is of smaller diameter, fitting the diameter of the sleeve.

The breech-frame is made with a recess, *b*, shaped to receive the pins F' and H when the cylinder is in firing position, as shown in Figs. 1 and 3. The cylinder is held in this position by a spring catch, O, working in the breech-frame, the same being forced outward by a spring, *o*, inserted in its socket beneath it. (See Figs. 3 and 4.) The spring-catch retreats and allows the cylinder to be swung outward or inward when the requisite force is applied to the cylinder. The outward movement of the cylinder is limited by the lug *d*, which, when the cylinder reaches the position shown in Figs. 2 and 4, comes in contact with the shoulder *b'*.

The operation is as follows: When the cartridges have been "shot off," and it is desired to reload, the cylinder is pressed out sidewise, the catch retreating by the pressure of the pin F' against its inclined face. When the cylinder has reached the position shown in Figs. 2 and 4 the cylinder is moved forward with some rapidity, gaining momentum until the end of the sleeve reaches the shoulder $F^2$, which arrests the forward movement of the sleeve, (and the extractor.) The continued forward movement of the cylinder draws out the cartridge-shells which are detained by the extractor. The free endwise motion of the sleeve on the pin H is of considerable practical importance, because the cartridge-shells stick in the bores of the cylinder and are dislodged with difficulty, unless the cylinder gains some momentum before the extractor acts upon them. The forward movement of the cylinder is arrested by the impingement of the shoulder N and collar M.

I claim—

1. In a revolver, the combination of suitable breech-frame, hinged frame, cylinder E, supported on the hinged frame, elongated pivot-pin H, sleeve I, intermediate of cylinder and pivot-pin, and arm F, formed with pin F' in line with the sleeve, as shown and described.

2. The combination of cylinder E, formed with longitudinal groove in its bore, elongated pin H, sleeve I, having perforations, and the spline L, fitting in the groove of the bore of the cylinder, and having ends $l$ $l$ inserted through the perforations in the sleeve and bearing upon the elongated pin, as set forth.

HENRY GOODMAN.

Witnesses:
SAML. KNIGHT,
D. P. KANE.